United States Patent [19]
Baum et al.

[11] 3,955,803
[45] May 11, 1976

[54] VERTICALLY ADJUSTABLE DOME RING FOR OXYGEN CONVERTER

[75] Inventors: Kurt Baum; Jörg Peter Baum; Hans-Dieter Weigelt, all of Essen, Germany

[73] Assignee: Verfahrenstechnik Dr. Ing. Kurt Baum, Essen, Germany

[22] Filed: Mar. 15, 1974

[21] Appl. No.: 451,508

[30] Foreign Application Priority Data
Mar. 29, 1973 Germany.................... 7311898[U]

[52] U.S. Cl. .............................................. 266/158
[51] Int. Cl.² ............................................ C21C 5/38
[58] Field of Search ........... 75/60; 122/7 A; 266/15, 266/16, 35, 36 P, 36 H

[56] References Cited
UNITED STATES PATENTS
3,797,812  3/1974  Ivessa.................................. 266/16
3,799,520  3/1974  Hegemann et al.................... 266/16

Primary Examiner—Gerald A. Dost
Attorney, Agent, or Firm—Charles E. Baxley

[57] ABSTRACT

This disclosure teaches a vertically adjustable water cooled dome ring between an upper rim of a crucible and its gas trap. The gas trap has a dome with a dome opening which substantially conforms in cross section to a mouth defined by the upper rim of the crucible. The upper rim is provided with a downwardly and inwardly inclined lip. The dome ring has a seating collar adapted to engage the upper rim in a substantially gas tight manner. The seating collar is adapted to engage the upper rim about the mouth outward and in proximity of the inclined lip. Manifolds for cooling water are kept out of contact with the upper rim. A labyrinth passage is provided for entry of air between the dome and the seating collar.

5 Claims, 4 Drawing Figures

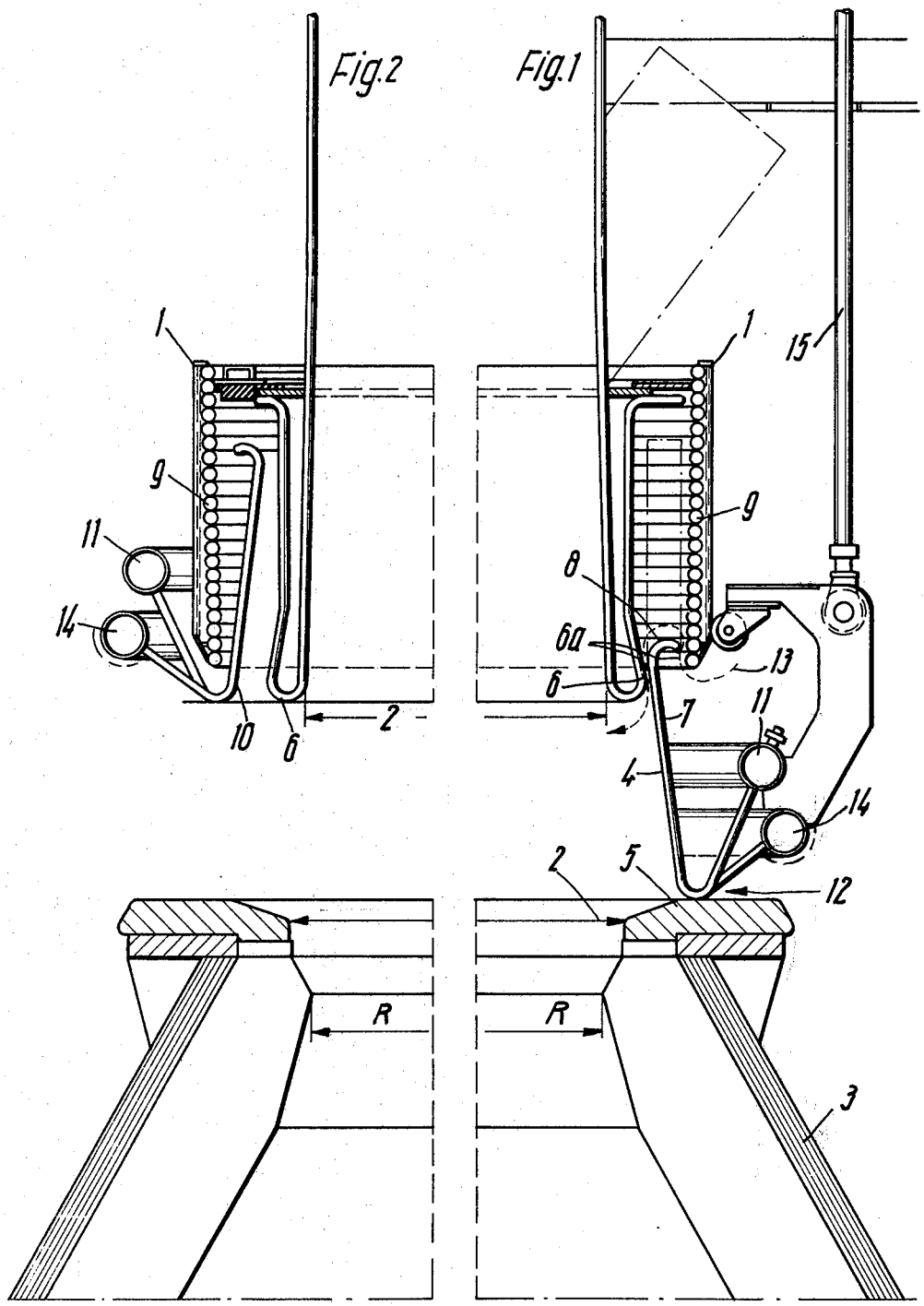

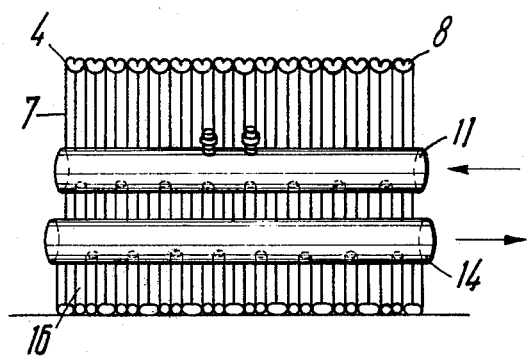
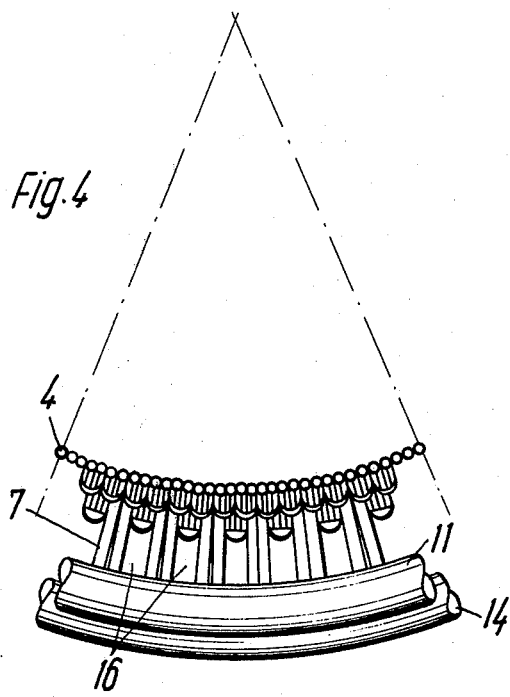

VERTICALLY ADJUSTABLE DOME RING FOR OXYGEN CONVERTER

BACKGROUND OF INVENTION

The present invention relates to a vertically adjustable dome ring for use in an oxygen converter. Dome rings are used in oxygen converters in order to enable regulation of the gas pressure in the gas trap between the crucible mouth and the dome.

In obtaining reaction gases during the operation of oxygen converters operating on the inflation of through principles, the technically and economically most suitable solution has proved to be maximally combustion free recovery of the reaction gases, with regard to cleaning of exhaust gases of the well known "red iron mist". The origin of the more or less high proportion of evaporated iron (iron mist) is the CO gases developed from carbon disintegration of raw iron, is known to stem from local exothermic reactions in the metal bath.

In order to obtain or extract the reaction gases as such with a minimum of combustion, the most varied constructions of movable connector pieces between converter and flue have been proposed, see for example German Patent No. 931,597, Austrian Patent No. 245,012, French Patent No. 1,355,311, and French Patent No. 1,418,065.

All these constructions are, even if in different ways, raisable and lowerable, and water cooled with regard to the extremely high temperatures in the relevant area. The second and fourth constructions have been carried out in practice, although under suitable operational conditions i.e. the second constructions, with a view to maximum yield for purposes of steam generation in a connected waste heat boiler, with total combustion. The third construction for the first time enabled exhaust gases to be obtained without any combustion. In this case a small excess pressure of nitrogen is maintained in the interior of the gas collecting dome, using a protective gas layer. A submerged closure is provided as a seal from the atmosphere. In this case the gas itself is for the first time obtained after cooling as a usable gas, and serves various purposes. In the fourth construction there is provided by means of a relatively extensive dome, a "cushion of combustion gas" which is in no way closely restricted, i.e. an inert gas between the actual CO gas core in the interior of the dome and the surrounding combustion air. Here also a pressure compensation of plus or minus zero must be maintained relative to the atmosphere, and the gas is burned off.

It is an object of the present invention to obtain the reaction gases in a combustion free manner by simple and reliable means.

STATEMENT OF INVENTION

According to the present invention there is provided a vertically adjustable water cooled dome ring between an upper rim of the crucible and the gas trap having a dome formed to correspond with the free outlet cross section of the converter with a seating collar adapted to engage the converter mouth in a gas tight manner, a peripheral air slot arrangement being provided between the seating collar and the dome.

As the actual formation of CO gas occurs in a more or less pulsating manner, i.e. with pressure pulses between plus or minus zero to plus 10 mm of water column, depending on the type and distribution of the oxygen in the metal bath, a principle requirement in obtaining reaction gases without combustion is the use of a corresponding suction or continuous low pressure of about this magnitude, i.e. of at least minus 10 mm water column, in order to prevent short term emergence of CO gases from the critical transition point between converter mouth and dome.

Such a fairly low pressure within the gas dome presupposes a limitation in the air supply by corresponding throttling, or by use of a narrow adjustable slot between the converter mouth and the gas dome, which must be adjustable at a selectable opening of the converter mouth between the latter and the subsequent gas trap. The present invention is to obviate or mitigate this problem by means of the seating collar, in which its connection to the converter mouth and the admission of outer air into the seating collar are spacially separated.

DESCRIPTION OF DRAWINGS

An embodiment of the present invention will now be described, by way of example, with reference to the accompanying drawings, in which:

FIG. 1 is an elevational view partly in section through one half of a dome ring according to the present invention in the operative position on the converter mouth.

FIG. 2 is a view which is in effect a mirror image of FIG. 1, but shows the ring of the dome in the open position.

FIG. 3 is a detail showing a side view of the cooling tube design.

FIG. 4 is a plan view, in partial section, of a segment of the cooling tubes, from which the dome ring is formed.

DESCRIPTION OF PREFERRED EMBODIMENT

Referring to the drawings, between the crucible upper edge in the gas trap of an oxygen converter there is formed a dome 1 from the free cross section 2 of the converter 3 with a seating collar 4 sitting in a gas tight manner about converter mouth 5, as shown by arrow 12 in FIG. 1. Between the set collar 4 and the dome 1 there is arranged a peripheral air slot 6, whose configuration is shown by arrow 13 in FIG. 1. FIG. 1 also shows that these air slots 6 in fact form labyrinths 6a. Set collar 4 is formed from cooling tubes 7. Cooling tubes 7 are supplied from cooling water pipes 11 and 14. According to the arrows in FIG. 3, pipe 11 may for example be a cooling water inlet, and pipe 14 a cooling water outlet. The raising and lowering device 15 for the set collar can be of conventional form (see FIG. 1), and therefore needs no description.

FIGS. 1 and 2 also show, that the cooling tubes 7 for the seating collar 4 are at inclinations. The tube bundle 9 on the gas extraction side is inclined at about 10° to the vertical, and the tube bundle 10 of seating collar 4 is about 7° to the vertical. This differing inclination is clearly visible in FIGS. 1 and 2.

According to the present invention, in the closed position of the dome ring as shown in FIG. 1, only a slight degree of low pressure of 15 mm water column need be overcome by the labyrinth 6a of air slot 6.

The above construction according to the present invention, in comparison with prior arrangements, enables a much freer and simpler design of dome and dome ring. The above arrangement of the air slot 6 between the bundled cooling tubes 7 and 9 is particularly advantageous, especially because of the air turbulence which is increased by the labyrinth 6a, thereby increasing heat transfer. If however solid slag particles are deposited, their amount remains low. Experience has shown that these slag particles adhere to a lesser degree to the cool surfaces, and are easily shaken off by normal operational vibration.

The diameter of the gas dome can now correspond to the free outlet cross section of the converter, so that practically no slag deposits are possible on the upper edge of the crucible by ejection or falling back of slag during operation. Slag deposits, such as occur in other constructions, in which the set collar moves on the outermost crucible rim, are therefore prevented or mitigated, so that such a slag covering cannot deform by hardening into "rams".

Formation of such rams, which can eventually lead to total blockage of the vertical adjustment of the seating collar, is prevented, because in the arrangement according to the present invention the air slot is moved from the horizontal to the vertical seal. This minimum air supply is appropriately controlled to about 10 percent of the theoretical combustion air. In this case the dome ring as such is totally enclosed from the exterior, i.e. it can be set on the converter mouth, while the small proportion of partial combustion air necessary for control is admitted through a type of "labyrinth closure" through a lateral, vertically arranged peripheral slot, between the set collar and gas dome.

During this setting, a vacuum of minus 15 mm water column is automatically produced within the gas dome, thus ensuring practically pluse free operation at this important connection point.

A further advantage of this removal of the partical combustion is that the latter now occurs locally, at a certain vertical distance from the crucible mouth, so that the otherwise frequently necessary cooling of the head plate of the crucible mouth can be eliminated.

Further, in this method of operation, sealing, for instance by a water bath, a submerged closure or any other seal, can be eliminated. Because of the previous high temperatures these measures are known to endanger operation on the entry of water into the metal bath on the one hand, and also bring a risk of dust deposits, entailing the considerable drawbacks of the necessary continuous cleaning.

A special advantage of the new pattern as regards the arrangement of a vertical air slot is that the latter, as a result of continuous operation during raising or lowering of the seating collar, is the best guarantee for continuous mechanical self cleaning of any slag deposits. Any projections can drop off automatically during both raising or lowering.

Another important factor is that the inclination of the tube arcs is suitably arranged at about 10° on the gas extraction side, whereas that of the actual seating collar is at about 7° to the vertical, to avoid rapid release of the slot during raising, or to prevent any jamming if the raising or lowering of the seating collar is not quite regular on all sides.

The winding of the actual cooling tubes, from which the seating collar is formed, is laid out as a result of experience in such a way that intermediate spaces are provided between the incoming and outgoing water pipes by means of an additional turn at the lower end of the construction, in such numbers that there is ease of access to the inner arc for cleaning or removal of deposits.

Finally, an advantage of the above dome ring according to the present invention is that the actual seating collar can at any time be optionally raised or lowered, for example during any disturbance in blower operation "formation of foam slag" or if for particular reasons a higher degree of partial combustion should be required.

The new dome ring is suitable in particular for use in methods or recovering reaction gases from steel conversion which are bottom blown with pure oxygen and cooled with hydrocarbons. It is a simple and useful riser means if in each case automatically upon mechanical placing down or erecting of the refining vessel, nitrogen is introduced instead of oxygen through the bottom nozzles and the entire cooling and cleaning systems thereby are flushed out. The adjusting ring is automatically shifted in height by known flue gas analyzers as a function of the composition of the flue gases in this application. For this purpose there are employed controls known in the art which are actuated by such analyzers, and preferably electromechanical controls.

It will be apparent that various deviations may be made from the shown and described preferred embodiment, without departing from a main theme of invention set forth in the following claims.

We claim:

1. A converter which includes a crucible having an upper rim organized about a mouth and which converter further includes a fixed gas trap operable at negative pressure and spacedly juxtaposed relative to the upper rim, the gas trap having a dome with a dome opening which opening substantially conforms in cross section with the mouth and is adapted to receive gases therefrom, a vertically adjustable water cooled dome ring between the dome and the upper rim, the dome ring having a seating collar adapted to engage the upper rim in substantially gas tight manner; the converter characterized by:

the upper rim of the crucible provided with a downwardly and inwardly inclined lip, the seating collar adapted to engage the upper rim about the mouth outward of and in close proximity of the inclined lip.

2. The converter of claim 1 with the seating collar formed by a plurality of cooling tubes with pairs of the cooling tubes bent at the upper ends to form upper hairpins and pairs of the tubes bent at their lower ends to form lower hairpins, means for circulating water through the cooling tubes to provide said water cooling.

3. The converter of claim 2 with the dome formed by a plurality of wall tubes organized with each wall tube having an inward portion and an outward portion joined together by an upwardly opening U-bend, the outward portion disposable inwardly relative to the upper hairpins to describe a labyrinth passage communicating atmosphere with the gas trap.

4. The converter of claim 3 with the cooling tubes of the seating collar having an upwardly closing inclination from vertical of about 7°, and the outward portion of the wall tubes of the dome having an upwardly closing inclination from vertical of about 10°.

5. The converter of claim 4 with the lower hairpins of the cooling tubes of the seating adapted to engage the upper rim,
the means for circulating water through the cooling tubes comprising an annular inlet manifold and an annular outlet manifold both spaced outwardly relative to the lower hairpins.

* * * * *

UNITED STATES PATENT AND TRADEMARK OFFICE
CERTIFICATE OF CORRECTION

PATENT NO. : 3,955,803
DATED : May 11, 1976
INVENTOR(S) : Kurt Baum, Jörg Peter Baum, Hans-Dieter Weigelt It is certified that error appears in the above-identified patent and that said Letters Patent are hereby corrected as shown below:

<u>Background of Invention</u> - Column 1, line 12, delete [of] and insert <u>or</u> therefor.

Column 3, line 12, delete [set] and insert <u>seating</u> therefor.

Column 3, line 16, delete [rams] and insert <u>"rams"</u> therefor.

Signed and Sealed this

Twenty-eighth Day of September 1976

[SEAL]

Attest:

RUTH C. MASON
*Attesting Officer*

C. MARSHALL DANN
*Commissioner of Patents and Trademarks*